US012626025B2

(12) United States Patent
Huang et al.

(10) Patent No.: US 12,626,025 B2
(45) Date of Patent: May 12, 2026

(54) COMPUTING SYSTEM AND TRUSTED COMPUTING METHOD

(71) Applicant: Shanghai Zhaoxin Semiconductor Co., Ltd., Shanghai (CN)

(72) Inventors: Zhenhua Huang, Beijing (CN); Yingbing Guan, Shanghai (CN); Yanting Li, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 365 days.

(21) Appl. No.: 18/189,381

(22) Filed: Mar. 24, 2023

(65) Prior Publication Data

US 2024/0143851 A1 May 2, 2024

(30) Foreign Application Priority Data

Nov. 2, 2022 (CN) .......................... 202211364597.9

(51) Int. Cl.
*G06F 21/85* (2013.01)
*G06F 13/24* (2006.01)

(52) U.S. Cl.
CPC .............. *G06F 21/85* (2013.01); *G06F 13/24* (2013.01)

(58) Field of Classification Search
CPC ................................ G06F 21/85; G06F 13/24
USPC ........................................................ 726/26
See application file for complete search history.

(56) References Cited

U.S. PATENT DOCUMENTS

| | | | |
|---|---|---|---|
| 8,145,902 | B2 | 3/2012 | Hatakeyama |
| 11,501,024 | B2 | 11/2022 | Anderson |
| 2004/0078590 | A1 | 4/2004 | Ellison et al. |
| 2004/0158681 | A1 | 8/2004 | Hooker |
| 2008/0162873 | A1 | 7/2008 | Zimmer |

(Continued)

FOREIGN PATENT DOCUMENTS

| | | |
|---|---|---|
| CN | 111221775 A | 6/2020 |
| CN | 115269456 A | 11/2022 |

(Continued)

OTHER PUBLICATIONS

Notice of Allowance dated Dec. 13, 2024, issued in U.S. Appl. No. 18/467,901.

(Continued)

*Primary Examiner* — Linglan Edwards
*Assistant Examiner* — Phuc Pham
(74) *Attorney, Agent, or Firm* — McClure, Qualey & Rodack, LLP

(57) ABSTRACT

A trusted computing technology is shown. An isolated memory stores a security interrupt descriptor table (SIDT) to correspond to security interrupts triggered by security peripherals. A first register of the trusted core stores a first address pointing to the SIDT. A local advanced programmable interrupt controller in the trusted core provides an interrupt arbiter that arbitrates between peripheral interrupts received from the chipset. When producing an arbitration result showing that a target interrupt is a security interrupt, the interrupt arbiter outputs a security interrupt request and a security interrupt vector to trigger the trusted core to search the SIDT indicated by the first register, to get a target security interrupt descriptor for execution of the corresponding interrupt program.

20 Claims, 7 Drawing Sheets

(56) References Cited

U.S. PATENT DOCUMENTS

| | | |
|---|---|---|
| 2012/0173877 A1 | 7/2012 | Pendakur |
| 2013/0007325 A1* | 1/2013 | Sahita ..................... G06F 21/53 |
| | | 710/267 |
| 2016/0283411 A1 | 9/2016 | Sheller |
| 2018/0096136 A1* | 4/2018 | LeMay ................. G06F 9/5016 |
| 2018/0285291 A1* | 10/2018 | Schulz ................... G06F 13/24 |
| 2020/0310972 A1 | 10/2020 | Shanbhogue |
| 2021/0224061 A1 | 7/2021 | Pillilli |
| 2023/0031974 A1 | 2/2023 | Suryanarayana |
| 2023/0342503 A1 | 10/2023 | Zhao et al. |
| 2024/0248702 A1 | 7/2024 | Nachimuthu |

FOREIGN PATENT DOCUMENTS

| | | |
|---|---|---|
| CN | 115905099 A | 4/2023 |
| KR | 20140113605 A | 9/2014 |

OTHER PUBLICATIONS

Ex Parte Quayle Action dated Jan. 31, 2024, issued in U.S. Appl. No. 18/048,535.

Non-Final Office Action dated Jul. 16, 2025, issued in U.S. Appl. No. 18/461,780.

Notice of Allowance dated Aug. 22, 2025, issued in U.S. Appl. No. 18/189,373.

Non-Final Office Action issued in U.S. Appl. No. 18/189,373, filed Mar. 24, 2023, mailed Apr. 21, 2025.

Office Action dated Nov. 5, 2025, issued in U.S. Appl. No. 18/461,780.

Notice of Allowance dated Feb. 3, 2026, issued in U.S. Appl. No. 18/461,780.

* cited by examiner

702

| message signaled interrupt | |
|---|---|
| based address info. | 0xFEE → 0xFEA |
| ⋮ | ⋮ |

FIG. 7

COMPUTING SYSTEM AND TRUSTED COMPUTING METHOD

CROSS REFERENCE TO RELATED APPLICATIONS

This application claims priority of China Patent Application No. 202211364597.9, filed on Nov. 2, 2022, the entirety of which is incorporated by reference herein.

BACKGROUND

Technical Field

The application relates to trusted computing, in particular to security peripherals for trusted computing.

Description of the Related Art

Trusted computing can improve computer system security by means of hardware division. For example, the system memory of a computing system can be partitioned to provide an isolated memory for trusted computing only.

How to design security peripherals for trusted computing is a major issue in this technical field.

BRIEF SUMMARY

A computing system in accordance with an exemplary embodiment of the present application includes a processor, a system memory, and a chipset. The processor includes a normal core, and a trusted core for trusted computing. The system memory provides a normal memory, and an isolated memory for the trusted computing. The chipset is coupled to the processor, the system memory, and a plurality of peripherals for communication among the processor, the system memory, and the plurality of peripherals. The isolated memory stores a security interrupt descriptor table to correspond to security interrupts triggered by security peripherals. A first register of the trusted core stores a first address pointing to the security interrupt descriptor table. A local advanced programmable interrupt controller of the trusted core includes an interrupt arbiter that arbitrates between peripheral interrupts received from the chipset. When producing an arbitration result showing that a target interrupt is a security interrupt, the interrupt arbiter outputs a security interrupt request and a security interrupt vector to trigger the trusted core to search the security interrupt descriptor table indicated by the first register, to get a target security interrupt descriptor for execution of a corresponding interrupt program.

Based on the aforementioned concept, a trusted computing method is also introduced.

To isolate the processing of security interrupts from the processing of normal interrupts, a particular security interrupt controller may be provided in the chipset (this is different from a normal interrupt controller), or a message signaled interrupt technique may be used. Furthermore, a security interrupt descriptor table (SIDT) and a related security interrupt mechanism are introduced. The trusted core may use a register to point to the SIDT.

A detailed description is given in the following embodiments with reference to the accompanying drawings.

BRIEF DESCRIPTION OF THE DRAWINGS

The application can be more fully understood by reading the subsequent detailed description and examples with references made to the accompanying drawings, wherein:

FIG. 7 illustrates a format of a message signaled interrupt (MSI) 702 in accordance with an exemplary embodiment of the application;

DETAILED DESCRIPTION

Figure 1:
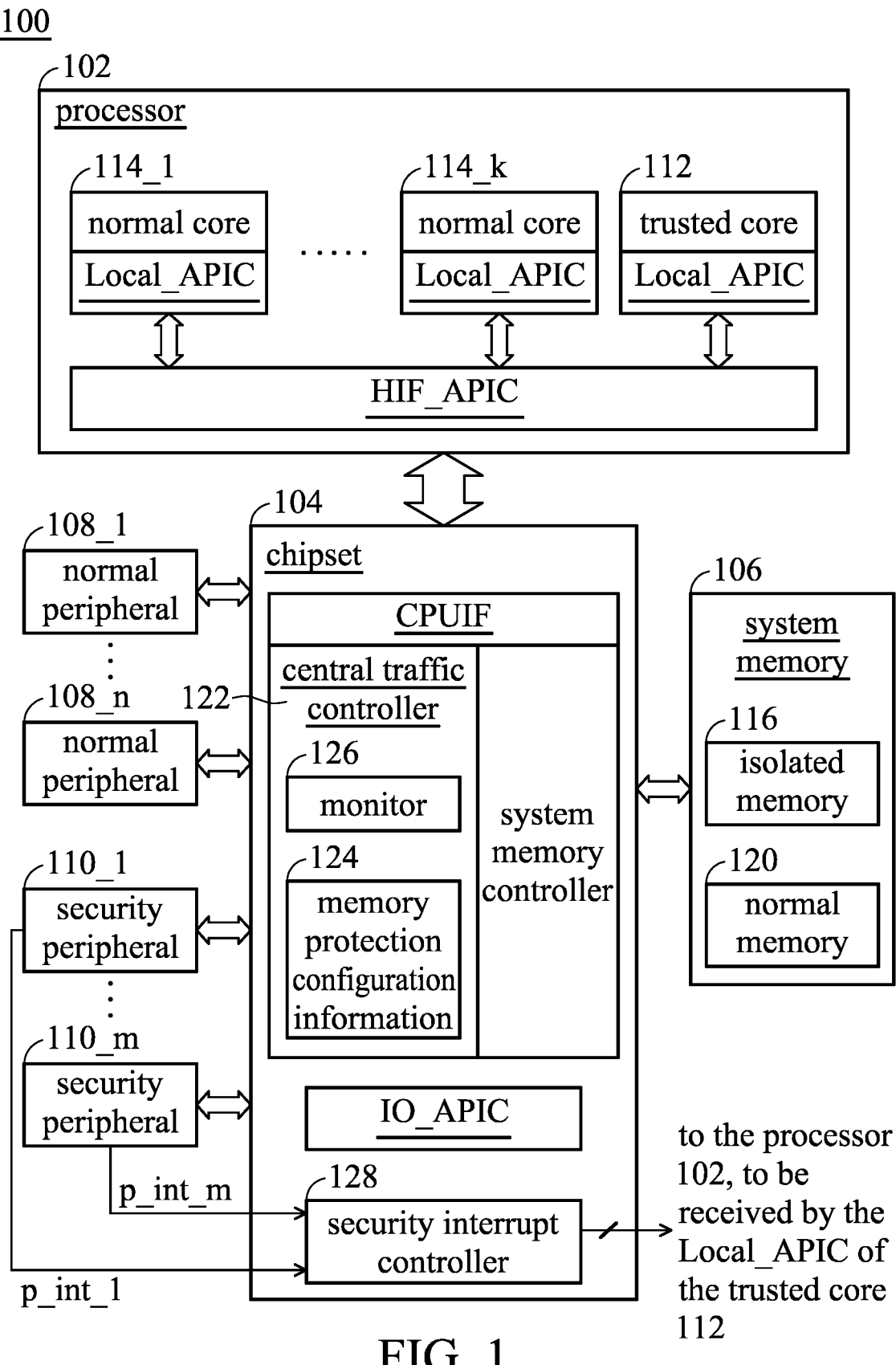
FIG. 1 depicts a computing system 100 in accordance with an exemplary embodiment of the application.

The following description is made for the purpose of illustrating the general principles of the application and should not be taken in a limiting sense. The scope of the application is best determined by reference to the appended claims.

For trusted computing, at least of section of a system memory is isolated for security use. The storage space different from the general use space is named a security memory. The non-trusted cores (normal cores for general use) and non-secure input and output devices (normal peripherals for general use) are not allowed to access the isolated memory. Only a trusted core dedicated to trusted computing (such as the core of TPCM technology), and security input and output devices (security peripherals) can access the isolated memory.

In this case, memory protection configuration information is defined and stored in the chipset, which includes isolation information (such as a base address and size of each section of the isolated memory), and peripheral information (such as showing that a peripheral of a particular peripheral identification code is a normal peripheral or a security peripheral). In this way, according to the memory protection configuration information (including the isolation information and the peripheral information) recorded in the chipset, the memory access requests initiated by the normal peripherals to access the isolated memory will be rejected by the chipset. On the contrary, the chipset will grant the execution of a memory access request that a security peripheral issues to access the isolation memory. Furthermore, a chipset may permit the normal peripherals to access the normal memory, and prohibit the security peripherals from accessing the normal memory.

In addition, the operating system assigns to each peripheral (a security peripheral or a general peripheral) an input and output range (I/O range, accessed through instructions "IN", or "OUT", etc.), or a memory-mapped input and output range (MMIO range, accessed through an instruction "MOV"). The I/O range and the MMIO range may be recorded by the chipset (for example, recorded as the above-mentioned memory protection configuration information).

When a normal core or a trusted core requests to access a peripheral, it will send a peripheral access request to the chipset. The peripheral access request may carry core identification code for the chipset to identify whether the peripheral access request is issued by a normal core or a trusted core. In this way, if a normal core asks to operate a security peripheral (that is, the access address the normal core requests to access falls into the I/O range or the MMIO range allocated to the security peripheral as recoded by the chipset), the chipset rejects the request. Conversely, if the trusted core asks to operate a security peripheral, the chipset grants it. If a normal core asks to operate a normal peripheral, the chipset grants the operation. If a trusted core asks to operate a normal peripheral, the chipset may deny it. The specific details will be described later in conjunction with the diagrams.

When a peripheral (a normal peripheral or a security peripheral) requests to access the system memory, it will send a memory access request to the chipset. The memory access request may carry a peripheral identification. According to the peripheral information and the peripheral IDs listed in the chipset, the chipset can identify whether the received memory access request is issued by a normal peripheral or a security peripheral. The memory access request also carries an access address, which is used to identify the access address of the system memory the peripheral device asks to access. According to the isolation information stored in the chipset and the access address indicate by the memory access request, the chipset identifies whether the peripheral device wants to access the normal memory or the isolated memory. In this way, if a normal peripheral asks to access the isolated memory, the chipset denies it. Conversely, if a security peripheral asks access to isolated memory, the chipset grants it. If a normal peripheral requests to access the normal memory, the chipset grants it. If a security peripheral asks to access the normal memory, the chipset may deny it. The specific details will be described later in conjunction with the diagrams.

This disclosure further introduces an interrupt technology for security peripherals.

FIG. 1 depicts a computing system 100 in accordance with an exemplary embodiment of the application, which includes a processor 102, a chipset 104, a system memory 106, and various peripherals (including normal peripherals 108_1 . . . 108_n, and security peripherals 110_1 . . . 110_m, wherein n and m are integers greater than or equal to 1).

The processor 102 is a multi-core processor, and these cores may be isomorphic cores (that is, the cores have the same structure), one of which is planned as a trusted core 112 (for trusted computing), and the rest are normal cores 114_1 . . . 114_k (k is an integer greater than or equal to 1). The processor 102 is coupled to the chipset 104, and the chipset 104 is further coupled to the system memory 106, the normal peripherals 108_1 . . . 108_n, and the security peripherals 110_1 . . . 110_m. The chipset 104 works for the communication among the processor 102, the system memory 106, and the peripherals (108_1 . . . 108_n and 110_1 . . . 110_m).

The system memory 106 may be a dynamic access memory (DRAM) or a static access memory (SRAM), and its space may be divided to include an isolated memory 116 and a normal memory 120. The isolated memory 116 needs to be isolated from the normal cores 114_1 . . . 114_k and the normal peripherals 108_1 . . . 108_n. Only the trusted core 112 and the security peripherals 110_1 . . . 110_m are permitted to access the isolated memory 116 for trusted computing. The normal memory 120 may be planned to be accessed by the normal cores 114_1 . . . 114_k and the normal peripherals 108_1 . . . 108_n.

The chipset 104 uses a central traffic controller 122 (responsible for the data transfer from the processor 102 to the peripherals, and from the peripherals to the processor 102) to store memory protection configuration information 124 and provide a monitor 126. The memory protection configuration information 124 may include the aforementioned isolation information, peripheral information, and so on. According to the memory protection configuration information 124, the monitor 126 does prohibit the normal peripherals 108_1 . . . 108_n from accessing the isolated memory 116, permits the security peripherals 110_1 . . . 110_m to access the isolated memory 116, and permits the normal peripherals 108_1 . . . 108_n to access the normal memory 120. In particular, according to the memory protection configuration information 124 (such as the aforementioned isolation information, peripheral information, etc.), the monitor 126 may deny the security peripherals 110_1 . . . 110_m to access the normal memory 120. The specific details will be described later in conjunction with FIGS. 2, 3, and 9.

According to the memory protection configuration information 124 (including the aforementioned isolation information and peripheral information), the monitor 126 further prohibits the normal cores 114_1 . . . 114_k from operating the security peripherals 110_1 . . . 110_m, permits the trusted core 112 to operate the security peripherals 110_1 . . . 110_m, permits the normal cores 114_1 . . . 114_k to operate the normal peripherals 108_1 . . . 108_n, and further prohibits the trusted core 112 from operating the normal peripherals 108_1 . . . 108_n. The specific details will be described later in conjunction with FIGS. 2 and 8.

The memory protection configuration information 124 may be stored in a set of registers of the chipset 104 or in an SRAM (not limited thereto). The details of memory protection configuration information 124 are described as follows.

After the system is powered on, the trusted core 112 operates prior to the normal cores 114_1 . . . 114_k to verify the trusted firmware (such as TPCM firmware) and the basic input and output system (BIOS). After verification, the trusted core 112 executes the trusted firmware to configure the peripherals that the trusted core 112 is permitted to access. Different peripherals are distinguished according to their peripheral identification code. The trusted core 112 configures the memory protection configuration information 124 to record the peripheral identification code, the I/O range 204, and the MIMO range 206 of each peripheral. The memory protection configuration information 124 may further show the peripheral type of each peripheral (to recognize a security peripheral or a normal peripheral). The memory protection configuration information 124 may further show isolation information of the isolated memory 116, to indicate the location of the isolated memory 116 in the system memory 106. In an exemplary embodiment, the isolated memory 116 is composed of separate storage sections, and the base address and size of each section may be recorded in the memory protection configuration information 124 to indicate the complete location information of the whole isolated memory 116.

In particular, only the trusted core 112 has the capability to modify the memory protection configuration information 124.

Figures 2, 3:
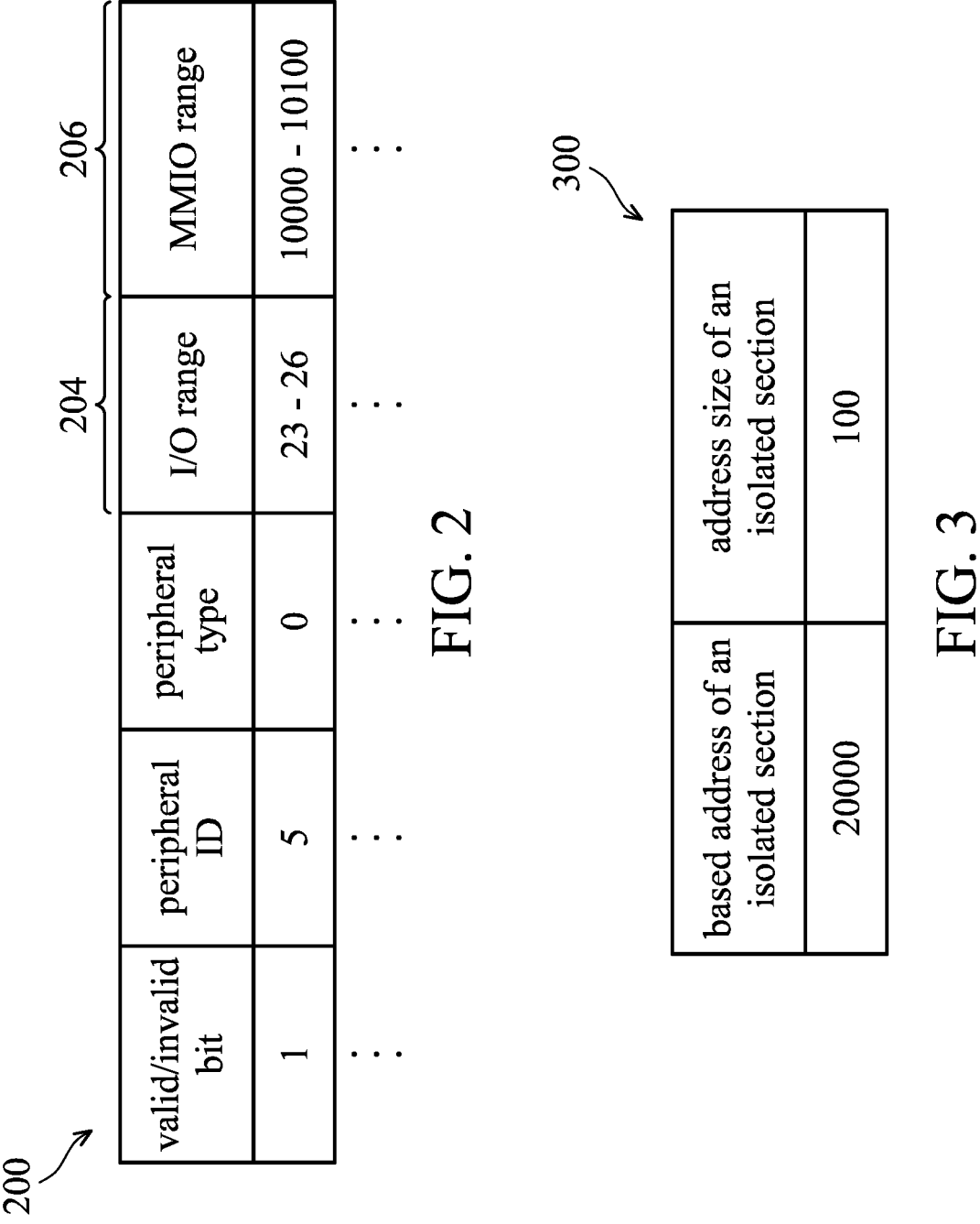
FIG. 2 shows a table 200 contained in memory protection configuration information 124 mentioned in FIG. 1.
FIG. 3 shows a table 300 that lists the base address and size of each section of the isolated memory 116.

FIG. 2 shows a table 200 contained in memory protection configuration information 124 mentioned in FIG. 1. The table 200 contains the aforementioned peripheral information. The table 200 shown in FIG. 2 may include multiple entries for several security peripherals and/or several normal peripherals. Each entry related to one peripheral shows: a valid/invalid bit (for example, '0' means invalid, and '1' means valid); peripheral identification code; a peripheral type (for example, '0' represents a security peripheral, and '1' represents a normal peripheral); an I/O range 204; and a MMIO range 206. The I/O range 204 and the MIMO range 206 may be selectively filled in, for communication between a peripheral and the processor 102. It should be noted that the security peripheral with the peripheral identification code 5 listed in FIG. 2 is just an example. The number of peripherals managed in the table 200 is not limited in the application.

FIG. 3 shows a table 300 that lists the base address and size of each section of the isolated memory 116. The table 300 contains the aforementioned isolation information. It should be noted that the base address "20000" and the size "100" presented in FIG. 3 are just for example. The base address and size may be presented in the other forms. There may be multiple entries listed in table 300 to indicate the different isolated sections.

In an exemplary embodiment, a memory access request that a source peripheral issues to access the system memory 106 usually carries the peripheral identification code of the source peripheral. In response to the memory access request that the source peripheral issues to access the system memory 106, the monitor 126 compares an access address indicate by the memory access request with the isolation information (referring to table 300) obtained from the memory protection configuration information 124, to determine whether the access address falls into the isolated memory 116. When the source peripheral is one of the security peripherals 110_1 . . . 110_m (referring to the table 200 of FIG. 2), the monitor 126 permits the execution of the memory access request that falls into the isolated memory 116. When the source peripheral is one of the normal peripherals 108_1 . . . 108_n, the monitor 126 prohibits the execution of the memory access request that falls into the isolated memory 116. When the source peripheral is one of the normal peripherals 108_1 . . . 108_n, the monitor 126 permits the execution of the memory access request that falls into the normal memory (the space beyond the isolated memory 116). When the source peripheral is one of the security peripherals 110_1 . . . 110_m, the monitor 126 may prohibit the execution of a memory access request that falls into the normal memory (the space beyond the isolated memory 116).

In an exemplary embodiment, a peripheral access request that a source core of the processor 102 issues to communicate with a target peripheral usually carries the core identification code of the source core. In response to a peripheral access request issued by the source core, the monitor 126 may query the memory protection configuration information 124 according to the access address indicated by the peripheral access request, to find the matching communication range (by checking the fields 204 and 206 of FIG. 2). According to the matching communication range, the target peripheral identification code and the target peripheral type are obtained from the memory protection configuration information 124. The monitor 126, therefore, identifies the target peripheral corresponding to the peripheral access request, and knows that the target peripheral is a security peripheral (for example, one of the security peripherals 110_1 . . . 110_m in FIG. 1) or a normal peripheral (for example, one of the normal peripherals 108_1 . . . 108_n in FIG. 1). The access address indicated by the peripheral access request may be an I/O address "25". Referring to the field 204 of FIG. 2, the I/O address "25" falls into the I/O range, from 23 to 26, of a peripheral device with the peripheral identification code "5". The monitor 126, therefore, judges that the peripheral identification code of the target peripheral is "5". Furthermore, in this entry, the peripheral type is '0', it means that the target peripheral is a security peripheral. In another case, the access address indicated by the peripheral access request is an MMIO address "10050". Referring to the field 206 of FIG. 2, the MMIO address "10050" falls into the MMIO range, from 10000 to 10100, of the peripheral device with the peripheral type "0". The monitor 126, therefore, judges that the peripheral identification code of the target peripheral is "5". Furthermore, in this entry, the peripheral type is '0', it means that the target peripheral is a security peripheral.

Based on the core identification code of the source core, the monitor 126 determines whether the source core is a normal core (for example, one of the normal cores 114_1 . . . 114_k in FIG. 1) or a trusted core (for example, the trusted core 112 in FIG. 1). When the source core is the trusted core 112 and the target peripheral is one of the security peripherals 110_1 . . . 110_m, the monitor 126 permits the source core to access the target peripheral. When the source core is one of the normal cores 114_1 . . . 114_k and the target peripheral is one of the security peripherals 110_1 . . . 110_m, the monitor 126 prohibits the source core from accessing the target peripheral. When the source core is one of the normal cores 114_1 . . . 114_k and the target peripheral is one of the normal peripherals 108_1 . . . 108_n, the monitor 126 permits the source core to access the target peripheral. When the source core is the trusted core 112 but the target peripheral is one of the normal peripherals 108_1 . . . 108_n, the monitor 126 may prohibit the source core from accessing the target peripheral.

Returning to FIG. 1, regarding peripheral interrupts, the chipset 104 provides an input and output advanced programmable interrupt controller IO_APIC for the normal peripherals 108_1 . . . 108_n, and specially designs a security interrupt controller 128 for the security peripherals 110_1 . . . 110_m. The different security peripherals 110_1 . . . 110_m each has a peripheral-chipset pin to be connected to the security interrupt controller 128 to transfer the security interrupts p_int_1 . . . p_int_m. For example, the security peripheral 110_1 is connected to the security interrupt controller 128 through its peripheral-chipset pin to output a security interrupt p_int_1 to the chipset 104, and the security peripheral 110_m is connected to the security interrupt controller 128 through its peripheral-chipset pin to output a security interrupt p_int_m to the chipset 104. The security interrupts issued by the security peripherals 110_1 . . . 110_m are transferred to the processor 102 through the security interrupt controller 128, and then be handed over to the local advanced programmable interrupt controller Local_APIC of the trusted core 112 for processing.

The security peripherals 110_1 . . . 110_m may issue messages to indicate the interrupts without through the security interrupt controller 128. A security peripheral (110_1 . . . 110_m) may output a message signaled interrupt (MSI for short). Through a processor interface CPUIF provided on the chipset 104, the MSI is transferred to the processor 102, and then the host interface advanced programmable interrupt controller HIF_APIC passes the MSI to the local advanced programmable interrupt controller Local_APIC of the trusted core 112 for processing.

The trusted core 112 and its local advanced programmable interrupt controller Local_APIC include designs for the security peripherals 110_1 . . . 110_m. The isolated memory 116 stores a security interrupt descriptor table for the security interrupts issued from the security peripherals 110_1 . . . 110_m.

Figure 4:
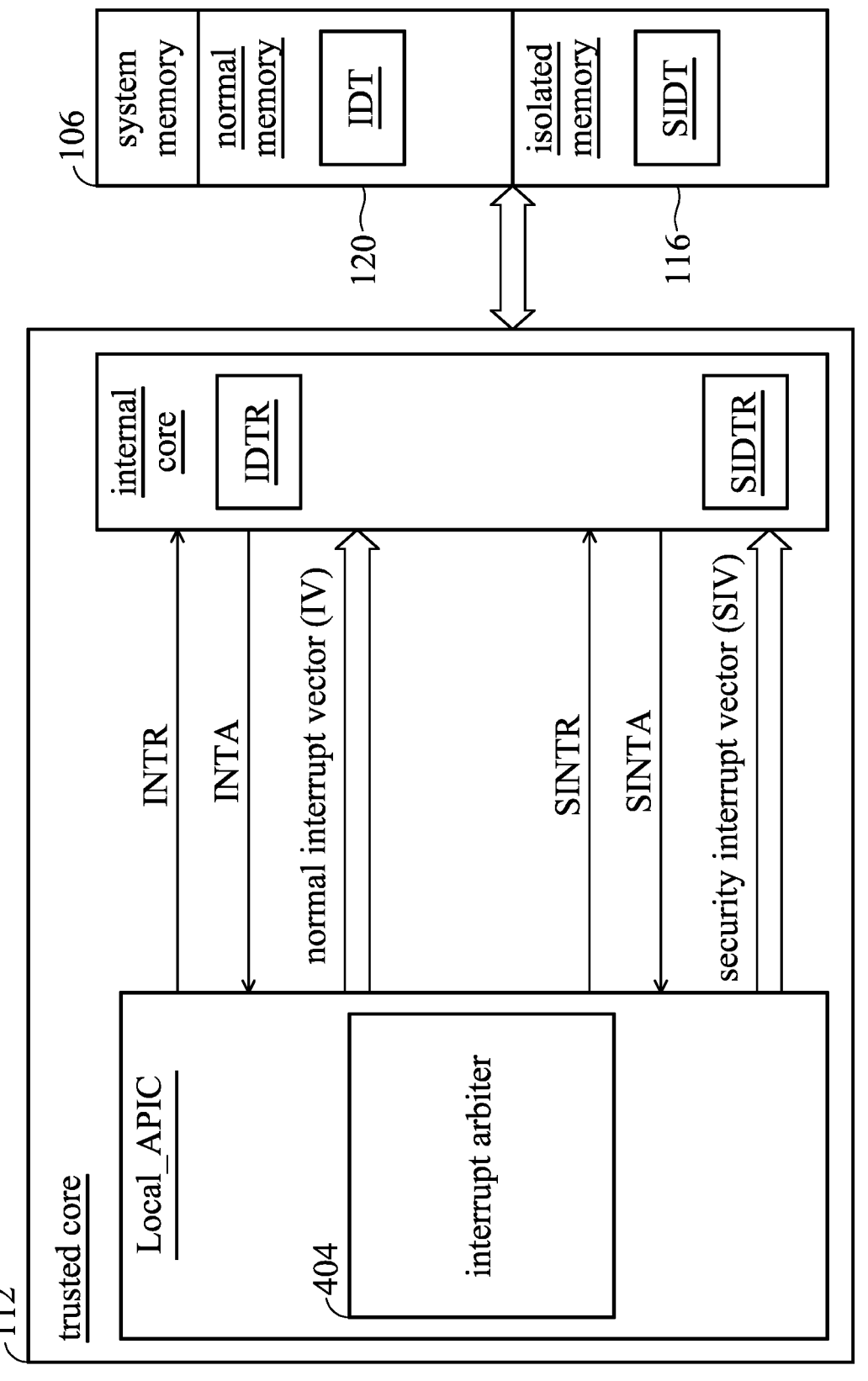
FIG. 4 illustrates how the processor 102 handles the interrupts in accordance with an exemplary embodiment of the application.

FIG. 4 illustrates how the processor 102 handles the interrupts in accordance with an exemplary embodiment of the application.

As mentioned above, the system memory 106 includes the normal memory 120 and the isolated memory 116. There is a normal interrupt descriptor table IDT recorded on the normal memory 120, and a security interrupt descriptor table SIDT recorded on the isolated memory 116. The security interrupt descriptor table SIDT lists security interrupt descriptors corresponding to the security interrupts issued by the security peripherals 110_1 . . . 110_m. According to a security interrupt descriptor related to a security interrupt, the trusted core 112 may search for and execute a corresponding interrupt program. The normal interrupt descriptors corresponding to the normal interrupts issued by the different normal peripherals 108_1 . . . 108_n are managed in the normal interrupt descriptor table IDT and stored on the normal memory 120. According to a normal interrupt descriptor related to a normal interrupt, the normal cores or the trusted core 112 may search for and execute a corresponding interrupt program.

In the internal core of the trusted core 112, the address of the normal interrupt descriptor table IDT is recoded in a register IDTR, and the address of the security interrupt descriptor table SIDT is recorded in another register SIDTR. The local advanced programmable interrupt controller Local_APIC designed for the trusted core 112 includes an interrupt arbiter 404. According to the interrupt type (no matter it's a security interrupt or a normal interrupt), the interrupt arbiter 404 performs a priority judgment, and then, corresponding to the higher priority interrupt, outputs an interrupt request signal (a normal interrupt request signal INTR or a security interrupt request signal SINTR) and an interrupt vector (a normal interrupt vector IV, or a security interrupt vector SIV) to the internal core of the trusted core 112, to wait for an interrupt acknowledge signal (a normal interrupt acknowledge signal INTA, or a security interrupt acknowledge signal SINTA) from the internal core of the trusted core 112. Corresponding to a normal interrupt, the internal core of the trusted core 112 checks the register IDTR to get the address indicating the normal interrupt descriptor table IDT, and uses the normal interrupt vector IV to query the normal interrupt descriptor table IDT to obtain the corresponding normal interrupt descriptor for execution of the corresponding normal interrupt program. Corresponding to a security interrupt, the internal core of the trusted core 112 checks the register SIDTR to get the address indicating the security interrupt descriptor table SIDT, and uses the security interrupt vector SIV to query the security interrupt descriptor table SIDT to obtain the corresponding security interrupt descriptor for execution of the corresponding security interrupt program.

Figure 5:
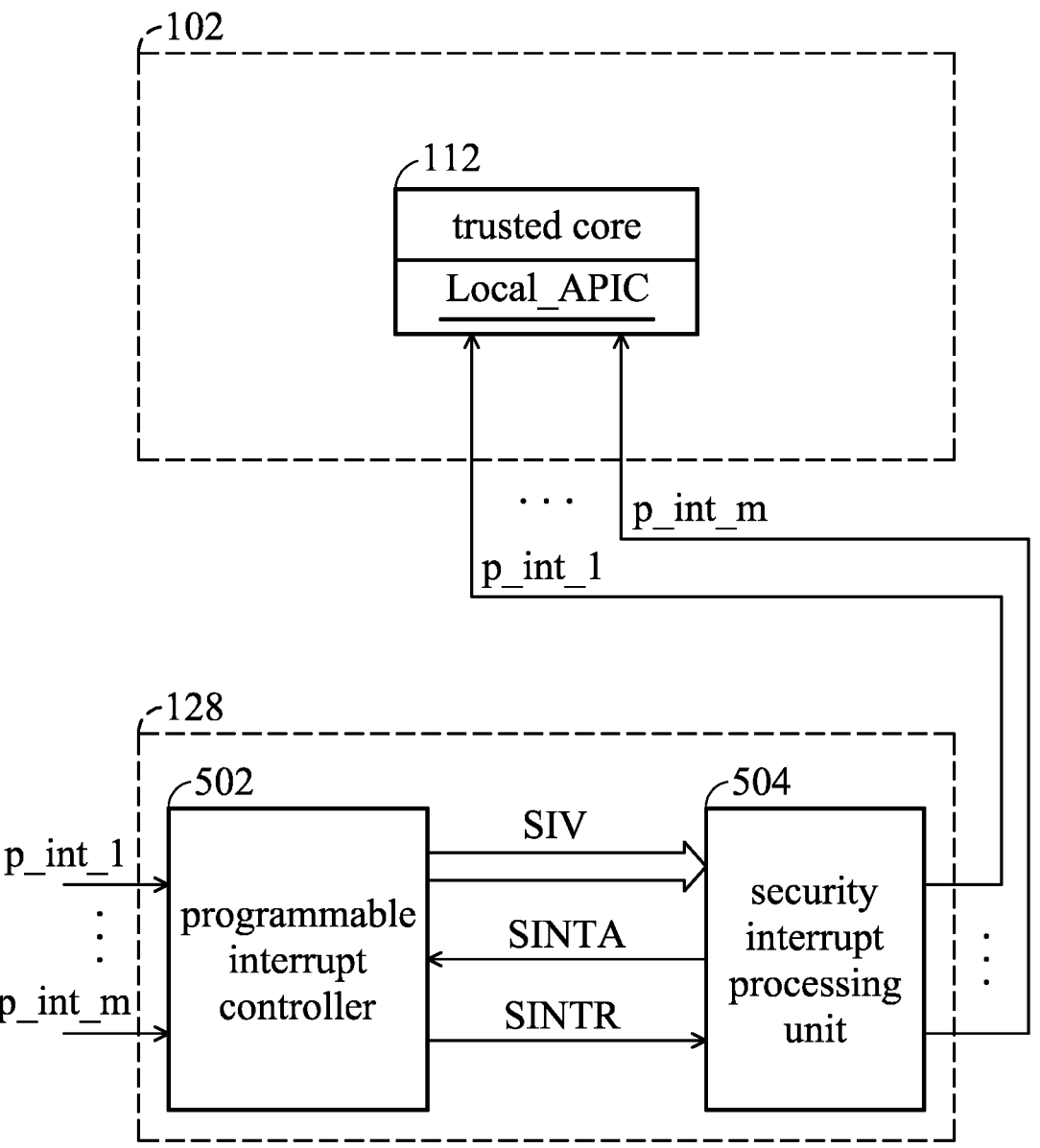
FIG. 5 illustrates details of the security interrupt controller 128 in accordance with an exemplary embodiment of the application.

FIG. 5 illustrates details of the security interrupt controller 128 in accordance with an exemplary embodiment of the application. The security interrupt controller 128 includes a programmable interrupt controller (PIC) 502, and a security interrupt processing unit 504. The security peripherals 110_1 . . . 110_m each uses a peripheral-chipset pin to couple to the PIC 502. The PIC 502 arbitrates the security interrupts received from the security peripherals 110_1 . . . 110_m, generates a security interrupt request SINTR as well as a security interrupt vector SIV for the security interrupt with the highest priority, outputs the generated SINTR and SIV to the security interrupt processing unit 504 for processing, and waits for a security interrupt acknowledge signal SINTA returned from the security interrupt processing unit 504.

The security interrupt processing unit 504 is coupled between the PIC 502 and the processor 102. The security interrupt processing unit 504 uses a plurality of chipset-processor pins corresponding to the plurality of security peripherals 110_1 . . . 110_m to connect itself to the processor 102. Based on the security interrupt vector SIV received from the PIC 502, the security interrupt processing unit 504 asserts the corresponding chipset-processor pin. In this way, the security interrupts p_int_1 . . . p_int_m are sent to the processor 102. Each security peripheral corresponds to a peripheral-chipset pin and a chipset-processor pin. For example, the security peripheral 110_1 corresponds to a pair of peripheral-chipset pin and chipset-processor pin, through which a security interrupt p_int_1 issued by the security peripheral 110_1 is transferred to the processor 102; the security peripheral 110_m corresponds to a pair of peripheral-chipset pin and chipset-processor pin, through which a security interrupt p_int_m issued by the security peripheral 110_m is transferred to the processor 102; and so on. As shown, the chipset-processor pins are all connected to the local advanced programmable interrupt controller Local_APIC of the trusted core 112. By determining which chipset-processor pin is asserted, the local advanced programmable interrupt controller Local_APIC of the trusted core 112 distinguishes which security peripheral triggers the security interrupt currently reported to the processor 102. For example: when the chipset-processor pin transferring the security interrupt p_int_1 is at a high level and other pins are at a low level, the local advanced programmable interrupt controller Local_APIC of the trusted core 112 determines that the current security interrupt p_int_1 reported to the processor 102 is triggered by the security peripheral 110_1; when the chipset-processor pin transferring the security interrupt p_int_m is at a high level and other pins are at a low level, the local advanced programmable interrupt controller Local_APIC of the trusted core 112 determines that the current security interrupt p_int_m reported to the processor 102 is triggered by the security peripheral 110_m; etc.

Figure 6:
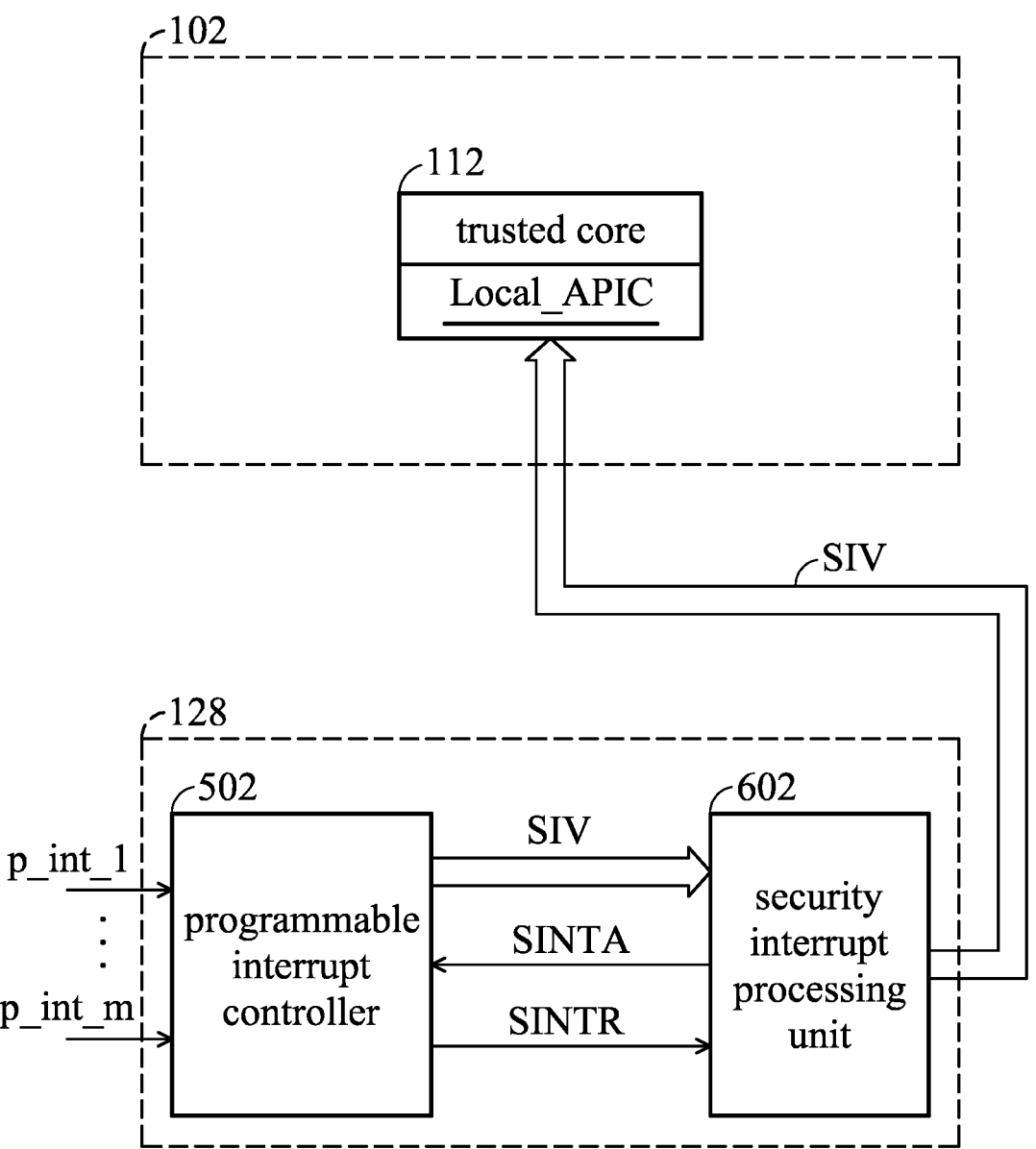
FIG. 6 illustrates details of the security interrupt controller 128 in accordance with another exemplary embodiment of the application.

FIG. 6 illustrates details of the security interrupt controller 128 in accordance with another exemplary embodiment of the application. Different from that taught in FIG. 5, the security interrupt processing unit 602 of FIG. 6 directly transfers the security interrupt vector SIV received from the PIC 502 to the processor 102, to be processed by the local advanced programmable interrupt controller Local_APIC of the trusted core 112.

The security interrupt controller 128 shown in FIG. 5 and FIG. 6 introduces a programmable interrupt control mode (PIC mode). The security interrupt controller 128 includes the PIC 502. Each security peripheral (one of 110_1 . . . 110_m) sends its security interrupt (the corresponding one of p_int_1 . . . p_int_m) to the security interrupt controller 128 via a corresponding peripheral-chipset pin, to be further forwarded to the trusted core 112 for processing via the PIC 502. As for how the trusted core 112 handles the received security interrupts p_int_1 . . . p_int_m, it has been explained above in conjunction with FIG. 4, and will not be repeated here.

In an exemplary embodiment, the security peripherals 110_1 . . . 110_m may not require the additional peripheral-chipset pins to connect to the security interrupt controller 128. Instead, the security interrupts are transferred through messages, and an advanced programmable interrupt control mode (APIC mode) is introduced. According to a peripheral component interconnect (PCI) standard, a security peripheral (one of 110_1 . . . 110__m_) transmits a message signaled interrupt (MSI) to the chipset 104, to be forwarded to the processor 102 through the processor interface CPUIF. The host interface advanced programmable interrupt controller HIF_APIC on the processor 102 then passes the received MSI to the local advanced programmable interrupt controller Local_APIC of the trusted core 112 for processing.

FIG. 7 illustrates a format of a message signaled interrupt (MSI) 702 in accordance with an exemplary embodiment of the application. As shown in FIG. 7, the base address information carried in the MSI 702 that the chipset 104 receives from a peripheral is 0xFEE. When the monitor 126 on the chipset 104 determines that the MSI 702 is issued by a security peripheral, the monitor 126 changes the base address information to a specific value, such as 0xFEA, to mark the MSI 702 as a security interrupt. The MSI 702 further carries the other information, such as an interrupt vector, etc., which is not described in detail here. In another exemplary embodiment, if the monitor 126 of the chipset 104 determines that the received MSI 702 originates from a security peripheral, the monitor 126 changes the base address information carried in the MSI 702 to another specific value, such as 0xFEB. The application does not limit the specific value for changing the base address information to mark a security interrupt. Any value different from 0xFEE may be used as the specific value.

The chipset 104 delivers the MSI 702 to the host interface advanced programmable interrupt controller HIF_APIC. If the base address information carried in the MSI 702 has been changed to the aforementioned specific value (for example, 0xFEA or other values different from 0xFEE), the host interface advanced programmable interrupt controller HIF_APIC recognizes that the MSI 702 is a security interrupt and hands it over to the local advanced programmable interrupt controller Local_APIC of the trusted core 112 for processing. The manner in which the trusted core 112 handles a security interrupt has been introduced above in conjunction with FIG. 4, and will not be repeated here.

Figure 8:
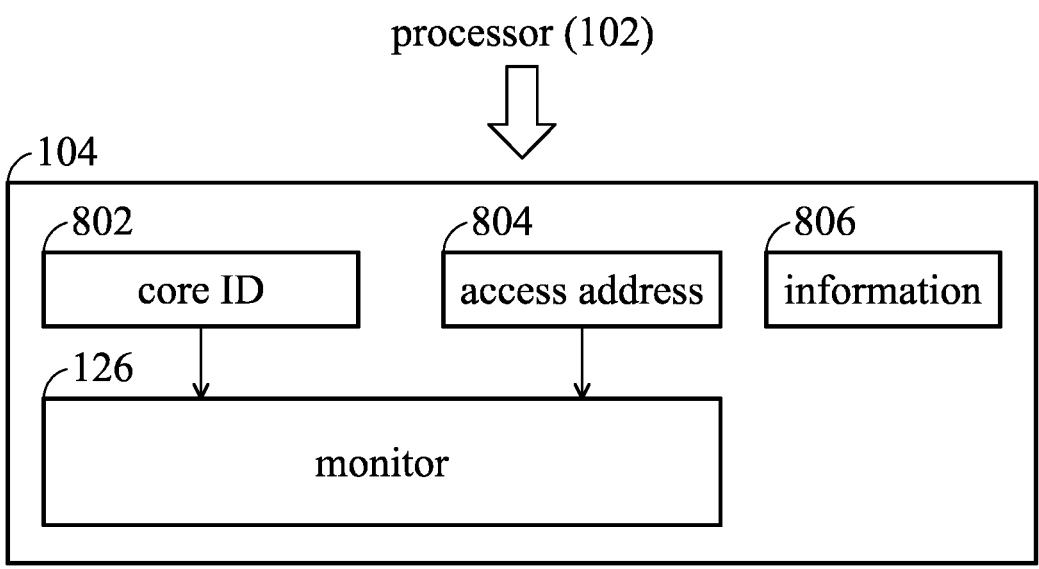
FIG. 8 illustrates how the processor 102 communicates with the peripherals.
Figure 9:
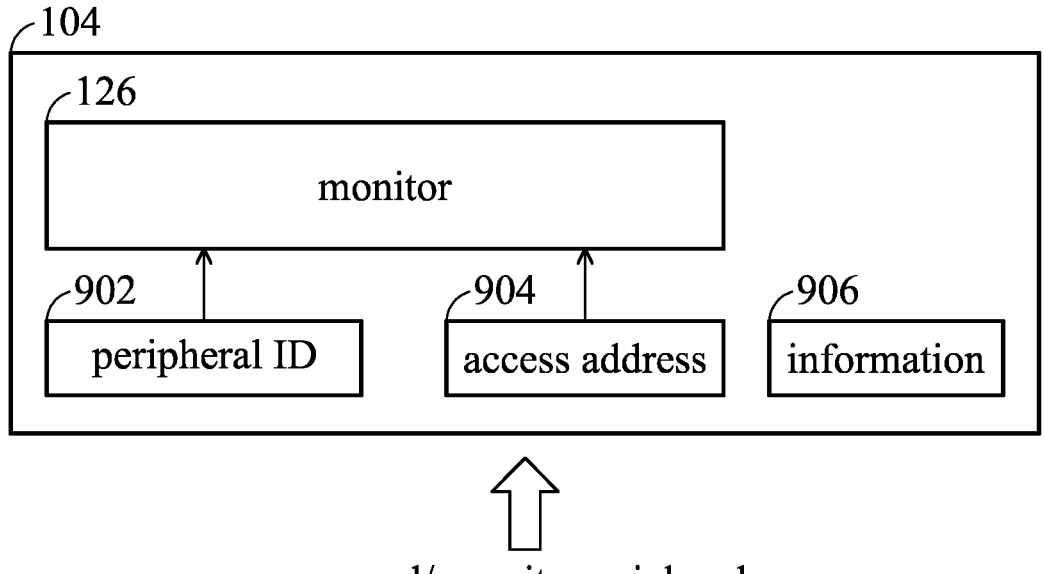
FIG. 9 illustrates how a peripheral communicates with the processor 102.

FIGS. 8 and 9 illustrate the detailed actions of the monitor 126 in accordance with exemplary embodiments of the application.

FIG. 8 illustrates how the processor 102 communicates with the peripherals. Please refer to FIG. 1 and FIG. 8 at the same time. As mentioned above, when the processor 102 requests to access a peripheral, the processor 102 outputs a peripheral access request to the chipset 104. The peripheral access request carries core identification code 802, an access address 804, and information 806. The access address 804 may be an I/O address or an MMIO address. The information 806 shows an operation command (that the processor 102 issues to operate the target peripheral; e.g., a peripheral reset command) or data (e.g., the data to be written into the peripheral). The processor-to-peripheral channel may use multiple bits to transfer the core identification code 802. As mentioned above, the monitor 126 installed on the central traffic controller 122 of the chipset 104 checks the core identification code 802 to determine whether the currently received peripheral access request comes from the trusted core 112 or any of the normal cores 114_1 . . . 114__k_. The monitor 126 may check the access address 804 to determine whether the processor 102 requests to access a normal peripheral or a security peripheral. After the recognition of the core and the target peripheral, the flowing rules are complied with:

Rule 1: only the trusted core 112 is permitted to access the security peripherals 110_1 . . . 110__m_; and Rule 2: only the normal cores 114_1 . . . 114__k_ are permitted to access the normal peripherals 108_1 . . . 108__n_.

In an exemplary embodiment, according to the access address (Addr) 804, the monitor 126 queries the table 200 (FIG. 2) contained in memory protection configuration information (124). The I/O range 204 or the MMIO range 206 matching the access address (Addr) 804 are obtained from the table 200 and, accordingly, the peripheral type ('0' representing a security peripheral, and '1' representing a normal peripheral) can be found from the matching entry. It is a clue to check whether Rule 1 or Rule 2 is satisfied. When the access address (Addr) 804 is an I/O address, the monitor 126 compares the access address (Addr) 804 with the I/O range (204) of each entry of the table 200, to determine whether any entry matches the access address (Addr) 804. In cases where the access address (Addr) 804 is an MMIO address, the monitor 126 compares the access address (Addr) 804 with the MMIO range (206) of each entry of the table 200, to determine whether any entry matches the access address (Addr) 804. A more detailed description of the operations are illustrated in this paper, and are not repeated here.

FIG. 9 illustrates how a peripheral communicates with the processor 102. Please refer to FIG. 1 and FIG. 9 at the same time. As mentioned above, when a peripheral requests to access the system memory 106 (e.g., to read data from the system memory 106, or to write data to the system memory 106), the peripheral outputs a memory access request to the chipset 104. The memory access request indicates peripheral identification code 902, an access address 904, and information 906. When the peripheral requests to write data to the system memory 106, the information 906 includes the write data that is issued from the peripheral to be written into the system memory 106. According to the peripheral identification code 902, the monitor 126 installed on the central traffic controller 122 of the chipset 104 determines whether the currently received memory access request comes from a normal peripheral (one of 108_1 . . . 108__n_) or a security peripheral (one of 110_1 . . . 110__m_). After the recognition of the source peripheral, the flowing rules are complied with:

Rule 3: the security peripherals 110_1 . . . 110__m_ are permitted to access the isolated memory 116;

Rule 4: the security peripherals 110_1 . . . 110__m_ are forbidden from accessing the memory space other than the isolated memory 116 (e.g. the normal memory 120); and Rule 5: the normal peripherals 108_1 . . . 108__n_ are permitted to access the normal memory 120, but are forbidden from accessing the isolated memory 116.

In an exemplary embodiment, according to the peripheral identification code 902 carried in the memory access request, the monitor 126 queries the table 200 (FIG. 2) contained in memory protection configuration information (124). The peripheral type ('0' representing a security peripheral, and '1' representing a normal peripheral) matching the peripheral identification code 902 is obtained from the table 200. The monitor 126 further queries the table 300 of FIG. 3 according to the access address (Addr) 904 the peripheral requests to access, to determine whether the peripheral asks to access the isolated memory 116. As shown in FIG. 3, the isolated memory base address is 20000 and the isolated memory address size is 100. It means that the isolated range is from 20000 to 20100. When the access address (Addr) 904 the peripheral requests to access is 20050 (falling into the range from 20000 and 20100), the monitor 126 determines that the source peripheral requests to access the isolated memory 116. According to the table lookup results, the monitor 126 determines whether the memory access request that the source peripheral issues to access the system memory 106 complies with the rule 3, rule 4, or rule 5.

The following examples describes several peripherals in accordance with exemplary embodiments of the application.

A high-speed peripheral may use a direct memory access (DMA) technology to access the system memory 106 to communicate with the processor 102. The configuration space allocated in the system memory 106 to configure the high-speed peripheral may be an MMIO space, or an I/O space. When performing DMA operations or accessing the MMIO or I/O space, the monitor 126 provided in the chipset 104 checks whether the isolated memory 116 is accessed, and checks whether the target peripheral is one of the security peripherals 110_1 . . . 110_m. In particular, the security interrupts issued by the security peripherals 110_1 . . . 110_m are different from the normal interrupts issued by the normal peripherals 108_1 . . . 108_n. The related programs for processing the security interrupts are protected by the trusted operating system (trusted OS) and executed by the trusted core 112, so as to really isolate the security peripherals 110_1 . . . 110_m from the normal peripherals 108_1 . . . 108_n.

The peripherals can actively request to access the system memory 106.

The network card is a high-speed peripheral. When operating the network card to transmit data, the processor 102 first prepares the data on the system memory 106, and then programs a configuration register of the network card controller (for example, changing one bit of the configuration register from 0 to 1) to inform the network card to fetch the data from the system memory 106. The network card uses DMA technology to fetch data from the system memory 106, and then issues an interrupt to acknowledge the processor 102. When receiving write data from an external device, the network card uses DMA technology to store the write data in a space that the processor 102 pre-configured in the system memory 106 (e.g., a space marked by the configuration register of the network card controller). Then, the network card generates an interrupt to inform the processor 102 for further processing. In an exemplary embodiment, the network card is a security peripheral operated by the trusted core 112, and is permitted to access the isolated memory 116 and triggers security interrupts.

A universal asynchronous receiver/transmitter (UART) device—such as a keyboard, mouse, etc.—is a low-speed peripheral. When receiving input data, the UART device outputs an interrupt to the processor 102, so that the processor 102 executes an instruction "IN" to read the input data according to the corresponding serial port address. Conversely, when operating the serial port to transmit data, the processor 102 configures the related configuration registers through I/O operations, and executes an instruction "OUT" to provide the write data corresponding to the target serial port address. During the I/O operations, the monitor 126 of the chipset 104 checks whether the target of these operations is one of the security peripherals 110_1 . . . 110_m which uses security interrupts to isolate itself from the normal peripherals 108_1 . . . 108_n. How the monitor 126 of the chipset 104 checks whether the target of these operations is a security peripheral, and how the security peripheral uses security interrupts have been detailed in the forgoing description, and not repeated here.

In this disclosure, memory protection configuration information is recorded in the chipset, for recognition of the normal peripherals and the security peripherals, and for recognition of the normal memory and the isolated memory. Based on the memory protection configuration information, only security peripherals are permitted to access the isolate memory, and only normal peripherals are permitted to access normal memory. In addition, the chipset uses a security interrupt controller (different from the normal interrupt controller) or an MSI technology. A security interrupt descriptor register, a security interrupt descriptor table, and the related security interrupt mechanism are introduced to isolate the processing of security interrupts from the processing of normal interrupts. Through the above design, the security peripherals implemented in this case have very high security.

While the application has been described by way of example and in terms of the preferred embodiments, it should be understood that the application is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computing system, comprising:
a processor, including a normal core, and a trusted core for trusted computing;
a system memory, providing a normal memory, and an isolated memory for the trusted computing; and
a chipset, coupled to the processor, the system memory, and a plurality of peripherals for communication among the processor, the system memory, and the plurality of peripherals,
wherein:
the isolated memory stores a security interrupt descriptor table to correspond to security interrupts triggered by security peripherals;
a first register of the trusted core stores a first address pointing to the security interrupt descriptor table;
a local advanced programmable interrupt controller of the trusted core includes an interrupt arbiter that arbitrates between peripheral interrupts received from the chipset, to separate processing of the security interrupts triggered by the security peripherals from processing of normal interrupts triggered by normal peripherals;
when producing an arbitration result showing that a target interrupt is a security interrupt, the interrupt arbiter outputs a security interrupt request and a security interrupt vector to trigger the trusted core to search the security interrupt descriptor table indicated by the first register, to get a target security interrupt descriptor for execution of a corresponding interrupt program.

2. The computing system as claimed in claim 1, wherein:
the normal memory stores a normal interrupt descriptor table to correspond to the normal interrupts triggered by the normal peripherals;
a second register of the trusted core stores a second address pointing to the normal interrupt descriptor table;
when producing an arbitration result showing that a target interrupt is a normal interrupt, the interrupt arbiter outputs a normal interrupt request and a normal interrupt vector to trigger the trusted core to search the normal interrupt descriptor table indicated by the second register, to get a target normal interrupt descriptor for execution of a corresponding interrupt program.

3. The computing system as claimed in claim 1, wherein:
the chipset transfers a message signaled interrupt received from a security peripheral to the processor, to inform the interrupt arbiter of the local advanced programmable interrupt controller of the trusted core that a security interrupt is issued by the security peripheral.

4. The computing system as claimed in claim 3, wherein:
the message signaled interrupt issued by the security peripheral is marked by the chipset for a host interface advanced programmable interrupt controller on the processor to recognize that the message signaled interrupt is issued by the security peripheral and, accordingly, the host interface advanced programmable interrupt controller transfers the message signaled interrupt to the interrupt arbiter of the local advanced programmable interrupt controller of the trusted core.

5. The computing system as claimed in claim 4, wherein:
the chipset changes base address information carried in the message signaled interrupt to a specific value to show that the message signaled interrupt is issued by the security peripheral.

6. The computing system as claimed in claim 1, wherein:
the chipset includes a security interrupt controller;
each security peripheral has a peripheral-chipset pin coupled to the security interrupt controller to transfer a security interrupt from the security peripheral to the security interrupt controller; and
the security interrupt controller is further coupled to the processor and, in response to a security interrupt received from a security peripheral, the security interrupt controller informs the interrupt arbiter of the local advanced programmable interrupt controller of the trusted core that the security interrupt is issued.

7. The computing system as claimed in claim 6, wherein the security interrupt controller comprises:
a programmable interrupt controller, arbitrating between security interrupts received from the security peripherals connected to the security interrupt controller and, according to an arbitration result, generating a security interrupt request and a security interrupt vector; and
a security interrupt processing unit, coupled between the programmable interrupt controller and the processor, wherein the security interrupt processing unit is coupled to the processor via chipset-processor pins corresponding to the different security peripherals and, according to the security interrupt vector received from the programmable interrupt controller, the security interrupt processing unit asserts a corresponding chipset-processor pin.

8. The computing system as claimed in claim 7, wherein:
the chipset-processor pins are coupled to the local advanced programmable interrupt controller of the trusted core.

9. The computing system as claimed in claim 6, wherein the security interrupt controller comprises:
a programmable interrupt controller, arbitrating between security interrupts received from the security peripherals connected to the security interrupt controller and, according to an arbitration result, generating a security interrupt request and a security interrupt vector; and
a security interrupt processing unit, coupled between the programmable interrupt controller and the processor, wherein the security interrupt processing unit transfers the security interrupt vector received from the programmable interrupt controller to the processor.

10. The computing system as claimed in claim 9, wherein:
the security interrupt vector that the security interrupt processing unit transfers to the processor is received by the local advanced programmable interrupt controller of the trusted core.

11. A trusted computing method, comprising:
operating an interrupt arbiter provided by a trusted core of a processor to arbitrate between peripheral interrupts received from a chipset, to separate processing of the security interrupts triggered by security peripherals from processing of normal interrupts triggered by normal peripherals; and
when the interrupt arbiter produces an arbitration result showing that a target interrupt is a security interrupt, operating the interrupt arbiter to output a security interrupt request and a security interrupt vector to trigger the trusted core to search a security interrupt descriptor table indicated by a first register, to get a target security interrupt descriptor for execution of a corresponding interrupt program.

12. The trusted computing method as claimed in claim 11, further comprising:
when the interrupt arbiter produces an arbitration result showing that a target interrupt is a normal interrupt, operating the interrupt arbiter to output a normal interrupt request and a normal interrupt vector to trigger the trusted core to search a normal interrupt descriptor table indicated by a second register, to get a target normal interrupt descriptor for execution of a corresponding interrupt program.

13. The trusted computing method as claimed in claim 11, further comprising:
operating the chipset to transfer a message signaled interrupt received from a security peripheral to the processor, to inform the interrupt arbiter of the trusted core that a security interrupt is issued by the security peripheral.

14. The trusted computing method as claimed in claim 13, wherein:
the message signaled interrupt issued by the security peripheral is marked by the chipset for a host interface advanced programmable interrupt controller on the processor to recognize that the message signaled interrupt is issued by the security peripheral and, accordingly, the host interface advanced programmable interrupt controller transfers the message signaled interrupt to the interrupt arbiter of the trusted core.

15. The trusted computing method as claimed in claim 14, wherein:
the chipset changes base address information carried in the message signaled interrupt to a specific value to show that the message signaled interrupt is issued by the security peripheral.

16. The trusted computing method as claimed in claim 11, wherein:
the chipset includes a security interrupt controller;
each security peripheral has a peripheral-chipset pin coupled to the security interrupt controller to transfer a security interrupt from the security peripheral to the security interrupt controller; and
the security interrupt controller is further coupled to the processor and, in response to a security interrupt received from a security peripheral, the security interrupt controller informs the interrupt arbiter of the trusted core that the security interrupt is issued.

17. The trusted computing method as claimed in claim 16, wherein the security interrupt controller comprises:

a programmable interrupt controller, arbitrating between security interrupts received from the security peripherals connected to the security interrupt controller and, according to an arbitration result, generating a security interrupt request and a security interrupt vector; and a security interrupt processing unit, coupled between the programmable interrupt controller and the processor, wherein the security interrupt processing unit is coupled to the processor via chipset-processor pins corresponding to the different security peripherals and, according to the security interrupt vector received from the programmable interrupt controller, the security interrupt processing unit asserts a corresponding chipset-processor pin.

18. The trusted computing method as claimed in claim 17, wherein:

the chipset-processor pins are coupled to a local advanced programmable interrupt controller of the trusted core.

19. The trusted computing method as claimed in claim 16, wherein the security interrupt controller comprises:

a programmable interrupt controller, arbitrating between security interrupts received from the security peripherals connected to the security interrupt controller and, according to an arbitration result, generating a security interrupt request and a security interrupt vector; and a security interrupt processing unit, coupled between the programmable interrupt controller and the processor, wherein the security interrupt processing unit transfers the security interrupt vector received from the programmable interrupt controller to the processor.

20. The trusted computing method as claimed in claim 19, wherein:

the security interrupt vector that the security interrupt processing unit transfers to the processor is received by a local advanced programmable interrupt controller of the trusted core.

* * * * *